June 6, 1950            J. R. RISTOW            2,510,659
BALL BEARING WHEEL
Filed May 23, 1947
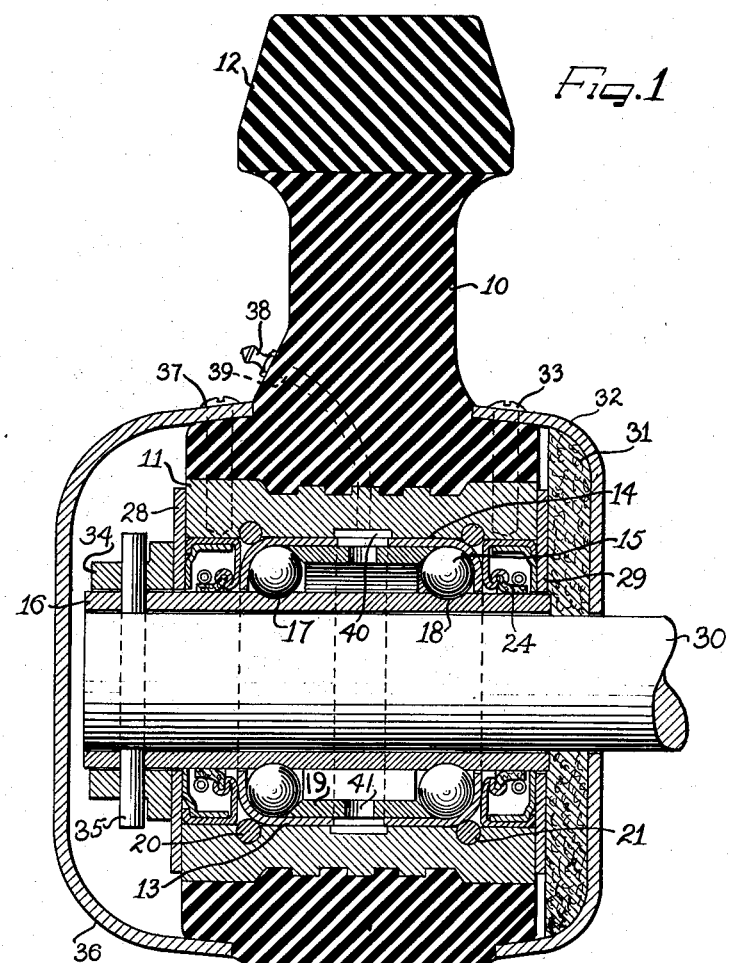
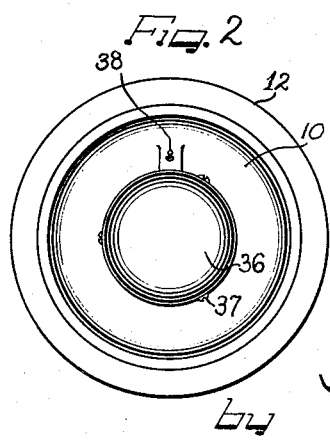
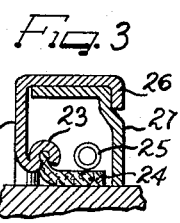
Inventor
John R. Ristow Patented June 6, 1950

2,510,659

UNITED STATES PATENT OFFICE 2,510,659

BALL-BEARING WHEEL

John R. Ristow, Chicago, Ill., assignor to St. John & Co., Chicago, Ill., a corporation of Illinois Application May 23, 1947, Serial No. 749,978

4 Claims. (Cl. 308—191)

This invention relates to an improvement in wheel constructions, and relates particularly to an improved form of wheel which may be readily attached to a rigid axle shaft on a vehicle.

One of the objects of the invention is to provide a wheel construction which when mounted on a rigid axle provides its own bearing surfaces, so that no smooth bearing surface need be provided on the axle shaft or rod.

Another object of the invention is to provide a wheel having a rubber web and tread molded upon a self-contained bearing mechanism, which may be readily attached to a non-rotatable axle shaft.

Another object of the invention is to provide a wheel having a self-contained anti-friction bearing unit therein, which is designed for mounting on a stationary axle rod or shaft, and is provided with a sealing and lubrication mechanism adapted to prolong the life of the wheel bearing.

Various particular objects and advantages of the invention will be mentioned hereinafter or will become apparent from a perusal of the following specification.

On the drawings:

Figure 1 is a central vertical transverse section through a wheel made in accordance with this invention;

Figure 2 is a side elevation of the wheel; and

Figure 3 is an enlarged detailed view of a water seal which is provided in this wheel bearing.

In the manufacture of the wheel, a web 10, preferably made of a composition containing natural rubber is molded directly upon the cast iron or cast steel core or hub 11. Since a current use of wheels of this character is in places where liquids on the floors would tend to deteriorate natural rubber, I prefer to mold on the perimeter of the web a tread 12 made of a synthetic type of rubber, for example, some synthetic composition such as neoprene, which is more resistant to acids and oils than is natural rubber.

Within the cast sleeve 11 there is mounted a ball-bearing mechanism consisting of the following parts. A pair of annular steel cups 13 and 14 are formed, preferably by stamping, to receive balls such as 15. An elongated cylindrical sleeve 16 having circular grooves 17 and 18, which are preferably hardened to constitute suitable bearing surfaces for the balls, is assembled with the two ball cups 13 and 14, and balls 15 and an inner sleeve 19. When these parts are assembled properly, in the relationship shown in Figure 1, the sleeve 19 is then spot-welded at a plurality of intervals to the cups 13 and 14, whereby the unit constitutes an assembled ball-bearing unit.

Thereafter when assembling the wheel, the ball-bearing unit assembly is inserted into the hub 11, being proportioned to have a snug fit, and a pair of split wire rings 20 and 21 of common construction are snapped into the circular grooves provided therefor in the sleeve 11 to retain the ball-bearing in the wheel hub.

The cups 14 and 15 after being formed, and the sleeve 16 after being grooved, should be hardened in accordance with some suitable and well known hardening process to provide a good ball race, which not only takes care of normal wheel rotation but end thrusts as well.

Thereafter the annular water seal about to be described may then be inserted into the wheel hub at each end of the ball-bearing unit, as shown. As the two water seals are alike one of them only need be described. Referring to Figure 3, the seal comprises a metal annular member 22 to which is secured by means of the crimped rolled edge 23 an annular compressible composition packing member 24 which may be held resiliently and tightly against the sleeve 16 by means of a continuous spiral spring 25. One edge 26 of the annular member 22 is flanged over to interlock with the annular metal member 27 which completes the assembly of the water-seal unit.

After the positioning of the two water seals on the sleeve 16, I then assemble the metal washers 28 and 29, in the positions shown. To abut the inner end of the bearing assembly and to snugly surround the stationary axle shaft or rod 30, I position a packing member 31 which may be of felt or other suitable compressible composition, which is held in place on the wheel and compressed by means of a cap 32 which can be secured by means of a plurality of bolts 33 which extend through the rubber web into the cast sleeve 11.

For holding the wheel on the shaft 30 I position a collar 34 which may be a casting, and then drive a pin 35 through this collar, through the sleeve 16 and through the shaft 30, through appropriate apertures provided therefor.

It will now be perceived that the sleeve 16 and collar 34 are held non-rotatably on the shaft 30 by means of the pin 35, but the wheel itself is free to rotate upon the sleeve 16, the balls 15 following the grooves 17 and 18.

After the wheel has been placed upon the shaft, a cap 36 may then be secured to the wheel by means of a plurality of bolts 37 which extend through the rubber and thread into the casting 11. Both of the caps 32 and 36 provide a watertight seal when they are clamped to the rubber web 10.

The wheel structure herein shown may be conveniently and adequately lubricated as follows. A fitting 38 of any well known type to which a pressure grease gun may be applied is secured upon the end of a tube 39 which extends through the rubber web 10 and through the cast hub member 11 into an annular groove 40 which is provided in the hub member. The grease forced into the tube will then flow around the groove 40 and passing between the margins of the cups 13 and 14 will be caused to flow through a plurality of apertures 41 which are provided at intervals in the sleeve 19. The grease then entering into the interior of the sleeve will flow between the balls and fill the ball race.

As it may be necessary from time to time to replenish the grease with a fresh supply, a grease gun may be attached to the fitting 38 and fresh grease forced into the bearing. The old grease, responsive to that pressure, can escape between the sleeve 16 and the margins of the cups 13 and 14 and flow through the water seals. The springs 25 will permit this grease, when the pressure is adequate, to be forced underneath the packing members 24 and then outwardly along the peripheral outer surface of the sleeve 16 into the interior of the outer hub cap 36. When a considerable amount of grease accumulates in the outer hub cap, it may be convenient to remove the old grease from time to time from that hub cap. Otherwise any excessive accumulation of grease in the hub cap may then enter between the sleeve 16 and the shaft 30 and flow in the opposite direction along the shaft 30 toward the vehicle body to which the shaft 30 is attached.

Such grease flowing along the axle shaft will itself constitute a water seal. Preferably when the wheel is being assembled on a shaft such as 30 I prefer to smear on the shaft a considerable amount of grease, which remaining there will constitute a water-seal in itself to restrain water from creeping along shaft 30 into the outer hub cap.

Considerable emphasis has been placed herein upon the use of water seals, for the following reasons. A wheel of the character shown may have many uses, but a valuable use, for which these wheels have been particularly designed, is for use on trucks of various types employed in meat packing houses. These trucks are used for transporting various portions of carcasses and in accordance with proper sanitary precautions they are subjected daily to most thorough washing and sterilizing to keep them in sanitary condition. Accordingly adequate water seals are required to keep the water out of the bearings.

While the simplest forms of wheel constructions generally provide wheel hubs which rotate directly upon stationary axles it is particularly desirable that wheels, especially for the purposes herein mentioned, have self-contained bearing surfaces so that no specially prepared bearing surfaces need be provided on the axle shafts. It is a common and very desirable feature in packing house trucks to have the axle shaft welded most securely to the truck body, particularly in view of the tremendous abuse to which these trucks are subjected in modern packing house operations. The trucks themselves are of very durable construction and intended for long life, hence it is not practical to have wheel axles which wear and which must be removed from vehicle bodies and replaced. Accordingly such wear as may take place occurs within the wheels themselves, and, as can be seen, wheels made in accordance with this invention are very readily replaced by new wheels.

The foregoing named advantages are sufficient to indicate the need for the unique and rugged construction which is provided in accordance with my invention. While the drawing shows a preferred embodiment of this invention it should be understood that the invention is not limited to the precise details herein shown and described, but is susceptible of some variation and modification without departure from the principles of the invention defined in the appended claims.

I claim as my invention:

1. A vehicle wheel comprising a sleeve member adapted to be slipped over a stationary axle shaft, means for securing said sleeve on the shaft against rotation and longitudinal movement, said sleeve having a pair of spaced peripheral grooves, a plurality of balls in said grooves, a cup-shaped race member embracing the balls in each groove, an annular sleeve welded to both cup-shaped members for retaining the bearing parts in assembled operative relation, a sleeve shaped hub member snugly surrounding the cup-shaped members, and a wheel web and tread supported on said hub member.

2. A vehicle wheel comprising a sleeve member adapted to be slipped over a stationary axle shaft, means for securing said sleeve on the shaft against rotation and longitudinal movement, said sleeve having a pair of spaced peripheral grooves, a plurality of balls in said grooves, a cup-shaped race member embracing the balls in each groove, an annular sleeve disposed within and welded to both cup-shaped members for retaining the bearing parts in assembled operative relation, a sleeve shaped hub member snugly surrounding the cup-shaped members, and a wheel web and wheel tread supported on said hub member.

3. In a vehicle wheel, a cylindrical sleeve member adapted to be slipped over a stationary axle shaft, means for affixing said sleeve against rotation and longitudinal movement on the shaft, a pair of spaced apart annular grooves in the peripheral surface of said sleeve for the rotation of bearing balls, a plurality of bearing balls positioned in said grooves, cup-shaped race members each embracing an annular row of said balls, and annular means disposed within said cup members securing the opposed marginal portions of said cup members rigidly together in position to hold said balls in said grooves.

4. In a vehicle wheel, a cylindrical sleeve member adapted to be slipped over a stationary axle shaft, means for affixing said sleeve against rotation and longitudinal movement on the shaft, a pair of spaced apart annular grooves in the peripheral surface of said sleeve for the rotation of bearing balls, a plurality of bearing balls positioned in said grooves, a pair of cup-shaped race members each having an inwardly curved flange embracing an annular row of said balls and having their cylindrical skirt portions mutually opposed, and an annular sleeve fixed to the inner surfaces of said skirt portions uniting said cup members and having chamfered end margins cooperating with said curved flanges forming outer bearing races closely confining said balls.

JOHN R. RISTOW.

REFERENCES CITED

The following references are of record in the file of this patent:

UNITED STATES PATENTS

| Number | Name | Date |
| --- | --- | --- |
| 466,438 | Simonds | Jan. 5, 1892 |
| 595,933 | Barker | Dec. 21, 1897 |
| 2,251,142 | Lindsay | July 29, 1941 |
| 2,427,430 | Waldeck | Sept. 16, 1947 |